United States Patent [19]
O'Brien et al.

[11] Patent Number: 5,420,578
[45] Date of Patent: May 30, 1995

[54] INTEGRATED TRANSMITTER AND CONTROLLER

[75] Inventors: Christopher J. O'Brien, New Britain; James O. Moore, Worcester, both of Pa.

[73] Assignee: Moore Products Co., Spring House, Pa.

[21] Appl. No.: 241,689

[22] Filed: May 12, 1994

Related U.S. Application Data

[63] Continuation of Ser. No. 143,540, Oct. 27, 1993, abandoned, which is a continuation of Ser. No. 732,071, Jul. 18, 1991, abandoned.

[51] Int. Cl.⁶ .................... G08C 15/08; G05B 15/02
[52] U.S. Cl. ...................... 340/870.13; 340/870.39; 340/870.16; 340/870.21; 364/139
[58] Field of Search ............... 340/870.13, 870.38, 340/870.39, 870.40, 870.16, 870.18, 870.21; 364/139, 138

[56] References Cited

U.S. PATENT DOCUMENTS

| | | | |
|---|---|---|---|
| 3,680,384 | 8/1972 | Grindheim . | |
| 4,001,703 | 1/1977 | Saul et al. | 340/870.39 |
| 4,190,822 | 2/1980 | Swarbrick | 340/870.39 |
| 4,242,665 | 12/1980 | Mate | 340/870.38 |
| 4,607,247 | 8/1986 | Sterling, Jr. et al. | 340/870.39 |
| 4,672,529 | 6/1987 | Kupersmit | 364/139 |
| 4,737,787 | 4/1988 | Ito et al. | 340/870.18 |
| 4,794,372 | 12/1988 | Kazahaya | 340/870.16 |
| 4,796,256 | 1/1989 | Opderbeck et al. | 370/110.1 |
| 4,806,905 | 2/1989 | McGowan, III et al. | 340/870.39 |
| 4,818,994 | 4/1989 | Orth et al. | 340/870.21 |
| 4,821,167 | 4/1989 | Wiebe | 364/139 |
| 5,333,114 | 7/1994 | Warrior et al. | 364/550 |

OTHER PUBLICATIONS

HART protocol, which was developed by Rosemount, Inc., of Eden Prairie, Minn. Feb. 1990.

Primary Examiner—Donnie L. Crosland
Attorney, Agent, or Firm—Synnestvedt & Lechner

[57] ABSTRACT

Integrated transmitters and controllers for use in monitoring process variables. A transmitter and controller for monitoring and controlling a process variable in a process control loop comprises a transmitter for producing a digital signal indicative of the process variable's state, and a digital controller supplied with the digital signal from the transmitter responsive to the digital signal, and further interfaced in a process control loop for controlling the process variable in response to the digitally communicated signal from the transmitter. Integrated transmitters and controllers described herein simplify installation and maintenance of industrial process control systems and place the controller functions at the process variable, thereby increasing control system efficiency.

3 Claims, 5 Drawing Sheets

FIG. I
PRIOR ART

INTEGRATED TRANSMITTER AND CONTROLLER

This is a continuation of copending application(s) Ser. No. 08/143,540 filed on Oct. 27, 1993, now abandoned, which is a continuation of Ser. No. 07/732,071, filed Jul. 18, 1991, now abandoned.

FIELD OF THE INVENTION

This invention relates generally to the process monitoring and control field. More specifically, this invention relates to transmitter and controller units and methods for controlling a process variable in a process loop.

BACKGROUND OF THE INVENTION

Process control is a long-established art which plays a major role in managing industrial plants and processes. In this art, process transmitters have been used to monitor process variables. Having evolved from the earliest measurement devices such as barometers and thermometers, the process transmitter has traditionally received a great deal of technological attention to improve performance due to the need for accurate process measurement. Since the accuracy of every measurement made in a process control loop is directly dependent upon the accuracy of the particular process transmitter or instrument which closes the loop, the process transmitter plays a particularly sensitive role in industrial process control systems.

Beginning in the 1950s, electrical and electronic process control loops were a natural development from prior electro-mechanical control systems. The general problem of electronic process control is to convert a physical variable to an electrical signal, and to subsequently transmit that signal to a recorder and/or other control equipment which may be located some distance away from the physical variable. Early types of process control loops to accomplish this goal were "four-wire" systems, and were configured such that operating power was supplied through two of the four wires and a process signal was transmitted through the other two wires. The four-wire system requires the use of amplifiers or other signal conditioning equipment at the point of measurement in order to supply an accurate signal representative of the physical variable since the process signal is generally very low. See, e.g., U.S. Pat. No. 3,680,384, of Grindheim. Prior four-wire transmitter systems thus required separate power supply lines, and low voltage power supplies.

After the four-wire transmitter was developed, it became apparent that the advantages of using the same two wires for power supply and information transmission would greatly improve the process control art. The "two-wire" transmitter was then developed and operates today in a control loop in conjunction with an external power supply, a pair of wires from the supply, and a transmitter connected serially between the wires. As used herein, the term "two-wire" is construed broadly to mean two conductors. Thus, the term "two-wire" includes actual wires, twisted pairs, coaxial cables, and other pairs of conductors.

During operation of such a two-wire transmitter loop, the transmitter energizes a sensor element and receives informational signals from the sensor element. The information is transmitted on the pair of wires by varying the current in the current loop. Thus the transmitter acts as a variable current sink, and the amount of current which it sinks is representative of the information from the sensor. Such prior two-wire transmitter loops have generally been analog in nature, and the industry standard which has developed for two-wire transmitters is a 4 to 20 milliamp loop, with a variable loop supply voltage having a maximum output of 24 volts DC. With such a low voltage supply, two-wire transmitter loops are particularly suited for use in hazardous environments. See, e.g., U.S. Pat. No. 4,242,665, of Mate.

In the operation of a typical process control system, a controller is usually located away from the source of the process variable which is to be measured and controlled. A controller may provide control of the process variable setpoint, and other parameters. Since prior controllers have usually been located both physically and electrically away from the process, they cannot be considered to be "integrated" with the transmitter in the loop.

Controllers provide an important function for process control systems, and remote communication units to provide control functions in a two-wire loop are known. See, e.g., U.S. Pat. No. 4,737,787, of Ito et al. The Ito et al. patent discloses data communication between a two-wire transmitter, and a receiver and communication unit which transmits digital data to a microprocessor in the transmitter. See col. 2, line 46 through col. 3, line 12 of the Ito et al. patent. The communication unit provides control to the entire system by operator command. See col. 3, lines 19–22 of the Ito et al. patent. The device disclosed in the Ito et al. patent is adaptable for future digital control and can be remotely adjusted by altering the device's communication state. See col. 7, lines 58–65 of the Ito et al. patent.

More advanced prior two-wire transmitter control loops exhibit high-level data communication between two-wire transmitters and various receiving elements, for example controllers and communication devices, For example, the concept of digital communication in 4 to 20 milliamp control systems is known for use in the more complicated 4 to 20 milliamp loops having both digital and analog components. Transmitters suitable for such purposes are usually called "smart" transmitters because they are more accurate and have operating parameters which may be remotely controlled.

As technology has progressed over the years, low powered microprocessors have made it possible to transport smart field transmitters into the digital signal processing environment. Furthermore, digital microprocessors make it possible to improve the accuracy of smart two-wire transmitters while allowing a communications protocol to be added to the loop.

Modern digital transmitters are also available with both hybrid and pure digital outputs. Thus, hybrid transmitters provide a 4 to 20 milliamp output signal along with a simultaneous digital communication signal to efficiently interface with a standard 4 to 20 milliamp analog loop. Transmitters with purely digital outputs provide communications on a dedicated data highway which is a data bus that carries the digital signal. On the highway, high level devices may be located which are capable of decoding the information received from the transmitter to aid in controlling the process.

Generally, to obtain higher accuracy smart transmitters, microprocessor-based units use digitally stored data in a local memory to provide precise corrections for the non-linearities associated with individual sensors in the loop. Smart transmitters can thus store, for example, ranging data indicative of the upper and lower values exhibited by the process variable, and can be reranged by instructing the microprocessor to look up and use a different set of range values. Smart transmitters also offer the future capability of fully digital communication with the control room.

Other smart transmitters utilize particular digital protocols for bidirectional communication between microprocessors and a loop interface, for example. See, e.g., U.S. Pat. No. 4,796,256 of Opderbeck et al. The Opderbeck et al. patent discloses a mini-packet receiver transmitter (MPRT) which provides an interface between one or two 8-bit microprocessors and a digital subscriber loop interface. See col. 2, lines 36–40 of the Opderbeck et al. patent. A "ping pong" protocol is bussed on a twisted pair to provide bidirectional communication between the microprocessors and the loop interface. See col. 2, lines 40–49 of the Opderbeck et al. patent. The ping pong protocol controls alternation of the receive and transmit mini-packet frames in the MPRT for implementation of the frame format. See col. 3, lines 26–28.

Another example of a smart, modular two-wire industrial control transmitter having connectable modules for use in a loop is shown in U.S. Pat. No. 4,818,914, of Orth et al. The Orth et al. patent teaches a two-wire industrial transmitter having a modular construction comprising a detector module connected by a serial bus to an output module. The output module includes a microprocessor and circuitry to output a sensed parameter. The detector module may include a plurality of sensing means to produce digital signals, at least one of which is used for correcting the digital signal representing the process variable. See col. 1, lines 32–49. The Orth et al. patent teaches a system having possible multi-drop mode configuration and coordination between sensors, for example, temperature and pressure transducers.

The trend in two-wire transmitter loops both in the smart, microprocessor-based transmitter area and the traditional analog transmitter area, has been to reduce the power requirements for components which are used in the loop. This need has arisen since the amount of power which a two-wire transmitter may draw from a current loop to use for its operation is severely limited. With a nominal 10-volt supply, at the bottom end of operation only about 40 milliwatts is available to power any instrumentation in the loop. Thus with large power demands on the loop, two-wire control systems may be limited to a few low power industrial control applications. This aspect of industrial controls competes with the general desire to design instrumentation into the loop to simplify loop operation and installation, and to provide intrinsic safety in a low power process control environment. This long-felt need has not adequately been met by process control loops which have the aforementioned inherent power budget problems.

While the aforementioned two-wire process transmitters and systems have been useful for many purposes, it has remained important to improve their accuracy and system response, to make them more reliable and to make them less expensive. It is also important to make process transmitters and controllers easier to install in a process loop and to improve their power consumption efficiencies, while also enabling use of plural transmitters and controllers to operate on a field bus or on the same two wires. Furthermore, it is desirable to provide the ability for bi-directional communications over the loop.

SUMMARY OF THE INVENTION

A transmitter and controller for monitoring and controlling a process variable in a process control loop is provided in accordance with the present invention. The transmitter and control comprises transmitter means for producing a digital signal representative of the process variable's state, and digital controller means supplied with the digital signal from the transmitter means responsive to the digital signal, and further interfaced with the process control loop for controlling the process variable in response to the digital signal from the transmitter means.

A method of process variable control in accordance with the present invention is also provided. The method preferably comprises the steps of interfacing a sensor with a process to transduce a digital signal that is indicative of the process variable's state, communicating the digital signal indicative of the process variable's state from the sensor to a digital controller unit integrated with a transmitter in the process control loop, and controlling the process variable with the controller in the process loop according to the digital signals indicative of the process variable's state received by the digital controller from the transmitter.

Integrated transmitter/controllers and methods of providing process variable control provided in accordance with the present invention and described herein solve the aforementioned long-felt needs. By integrating the transmitter and controller, greater measurement and control accuracy is achieved as compared to prior transmitters which require conversion of the digital process variable to an analog loop current through a digital to analog (D/A) converter. In prior systems, analog loop current is read by a controller which converts it to a digital value through an analog to digital (A/D) converter. Every conversion adds as much as 0.03 percent of span error or 0.06 percent for two conversions. This is a significant additional error for devices whose accuracies range between 0.035 percent and 0.1 percent of span in typical prior systems. Integrated transmitter/controllers in accordance with the present invention thus reduce the span error.

Furthermore, integrating the transmitter and controller improves system response. Since every digital device has an update and dead time associated with it, the number of digital devices in the system affects the system's speed. In accordance with the present invention, the two-wire control loop has a dead time from about 150 to about 300 milliseconds and an update rate of about 150 milliseconds.

Prior process control systems require a separate controller and a separate transmitter to provide process variable control. Integrated transmitter/controller systems in accordance with the present invention require only an integrated transmitter/controller whose cost is similar to existing single function transmitters. This eliminates the need for a separate controller unit which is approximately 40–60 percent of the cost for the separate transmitter and controller option. Furthermore, since only one instrument need be installed in accordance with the present invention, the time required, and hence cost to install the system, is concomitantly reduced. Wiring costs are also reduced because only one pair of wires is required for the loop and the extra pair of wires required to connect a controller remote from the process is eliminated. Also, since the reliability of the system decreases with the increasing number of components, the reduction of separate components in systems provided in accordance with the present invention greatly increases the systems' reliability.

A further advantage with integrated transmitter/controllers in accordance with the present invention comes with the benefits of a unified transmitter/controller where the analog signal need no longer be transmitted to the control room. Because of this, multiple loops can be run off a trunk pair of wires that may or may not provide power for the control loop, but would support communications between the control room and other field mounted instruments. This provides even greater savings than already realized by going from two pair of wires to one, since one pair of wires can now service multiple loops. Additional savings are realized when this configuration is implemented in an intrinsically safe area because every set of wires must have an electrical protection device or "barrier." By reducing the number of pairs of wires to one installation, equipment and installation savings are thus efficiently realized.

The aforementioned advantages and solutions to the long-felt needs in the art provided in accordance with the present invention will be better understood by the following detailed description read in conjunction with the drawings.

DETAILED DESCRIPTION OF PREFERRED EMBODIMENTS

Figure 1:
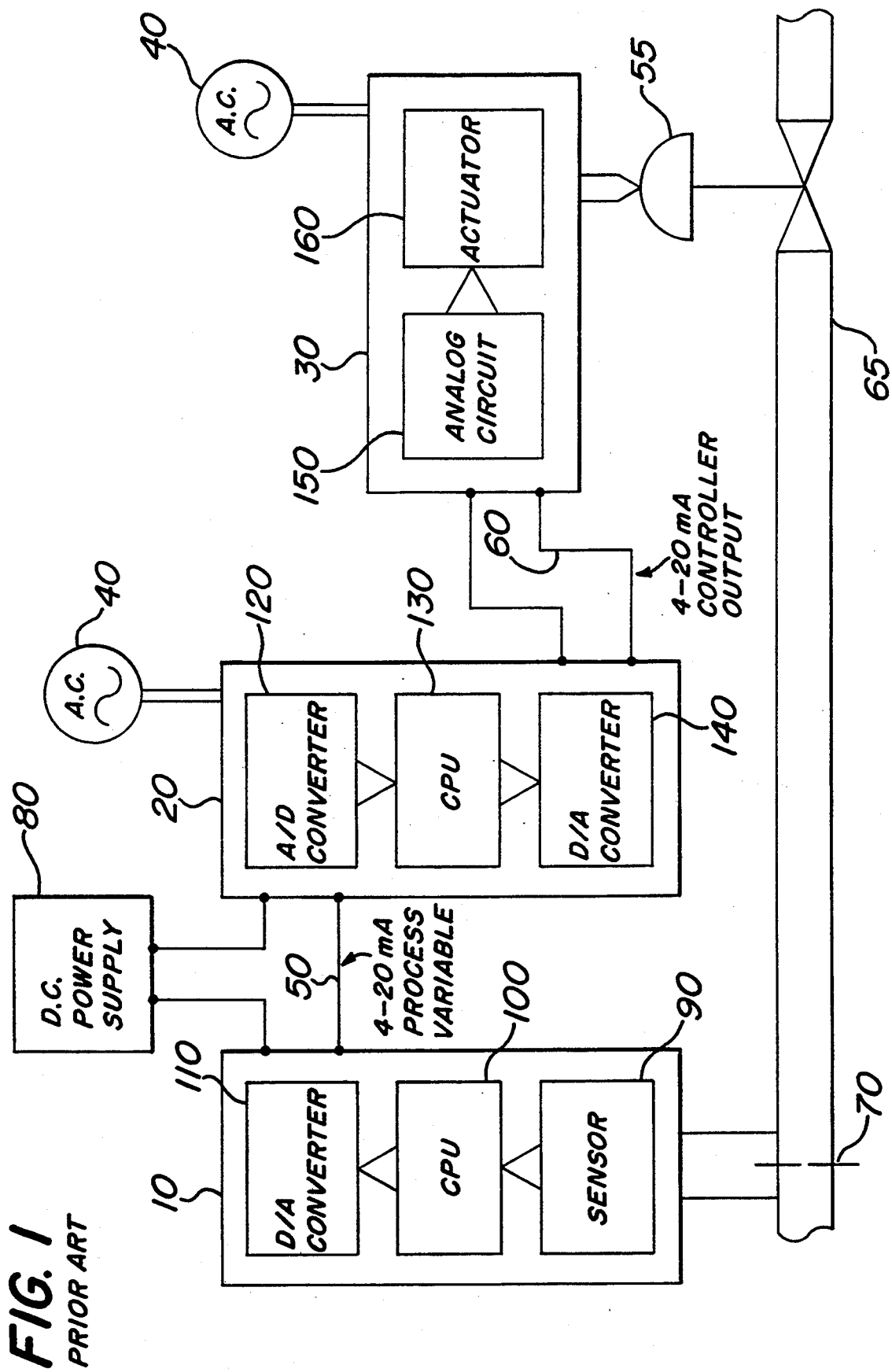
FIG. 1 shows a prior two-wire transmitter system having a separate transmitter and separate controller in the control loop.

Referring now to the drawings wherein like reference numerals refer to like elements, for comparison purposes it is useful to illustrate a prior art two-wire transmitter system utilizing separate transmitters and controllers to provide process control, as shown in FIG. 1. The prior two-wire transmitter control system shown generally comprises three devices to perform the process control. The transmitter 10 relays information about the process to be controlled to a control element or controller 20 which is separate from transmitter 10 and is not in any way integrated with transmitter 10. Thus, controller 20 is both physically and electrically remote from transmitter 10 and requires a separate AC power supply 40 to run its internal electronics. The controller 20 interprets transmitter output 50, which is usually a 4 to 20 milliamp process variable signal indicative of the state of the process variable, so that a 4 to 20 milliamp controller output signal 60 can be relayed to a final control element 30 to provide process control.

The final control element 30 is also independently powered by an AC power supply 40 and controls a valve 55 interfaced with the process pipe 65 carrying an industrial process fluid. In the case of a pressure, differential pressure, or flow variable measurement, valve 55 changes the flow of the material in pipe 65 past sensor interface 70 in the transmitter 10. It will be recognized by those skilled in the art that other variables, such as temperature, differential temperature, capacitance, and others are all amenable to control in a process control loop such as that shown in FIG. 1. In addition, an oscillator (not shown) is provided to drive the sensor. In preferred embodiments, the oscillator is a multi-mode oscillator as shown in commonly assigned U.S. Pat. No. 4,794,320, Chang, the teachings of which are specifically incorporated herein by reference.

The two-wire loop providing 4 to 20 milliamp signals 50 and 60 is powered by DC power supply 80 which is generally a variable 0–24 volt DC supply. Transmitter 10 contains a sensor 90 which is interfaced with the process at 70. Many types of sensors may be used in two-wire transmitter 10, such as a differential pressure cell, a pressure cell, a flow sensor, a thermocouple, and other sensors. Transmitter 10 also comprises a central processing unit (CPU) 100 which interprets information received from sensor 90 in digital form, and sends this data to a D/A converter 110 in the transmitter which modulates the loop current 50 as an analog representation of the process variable interfaced to the system at 70.

In the prior art system shown in FIG. 1, controller 20 normally comprises an input A/D converter 120 that receives and converts to digital form the transmitter output 4 to 20 milliamp process variable signal from the transmitter 10. A second CPU 130 is interfaced with A/D converter 120 and is provided with a control algorithm to generate a controller output value which is bussed to a D/A converter 140 in the controller that converts the CPU signal to a 4 to 20 milliamp controller output analog signal 60.

The final control element 30 comprises an analog input stage 150 which is adapted to receive the 4 to 20 milliamp controller output signal 60. The analog circuit 150 is interfaced with an actuator 160 which converts the 4 to 20 milliamp controller output 60 to a pneumatic or electric force used to position the final control valve 55 or other control device.

Figure 2:
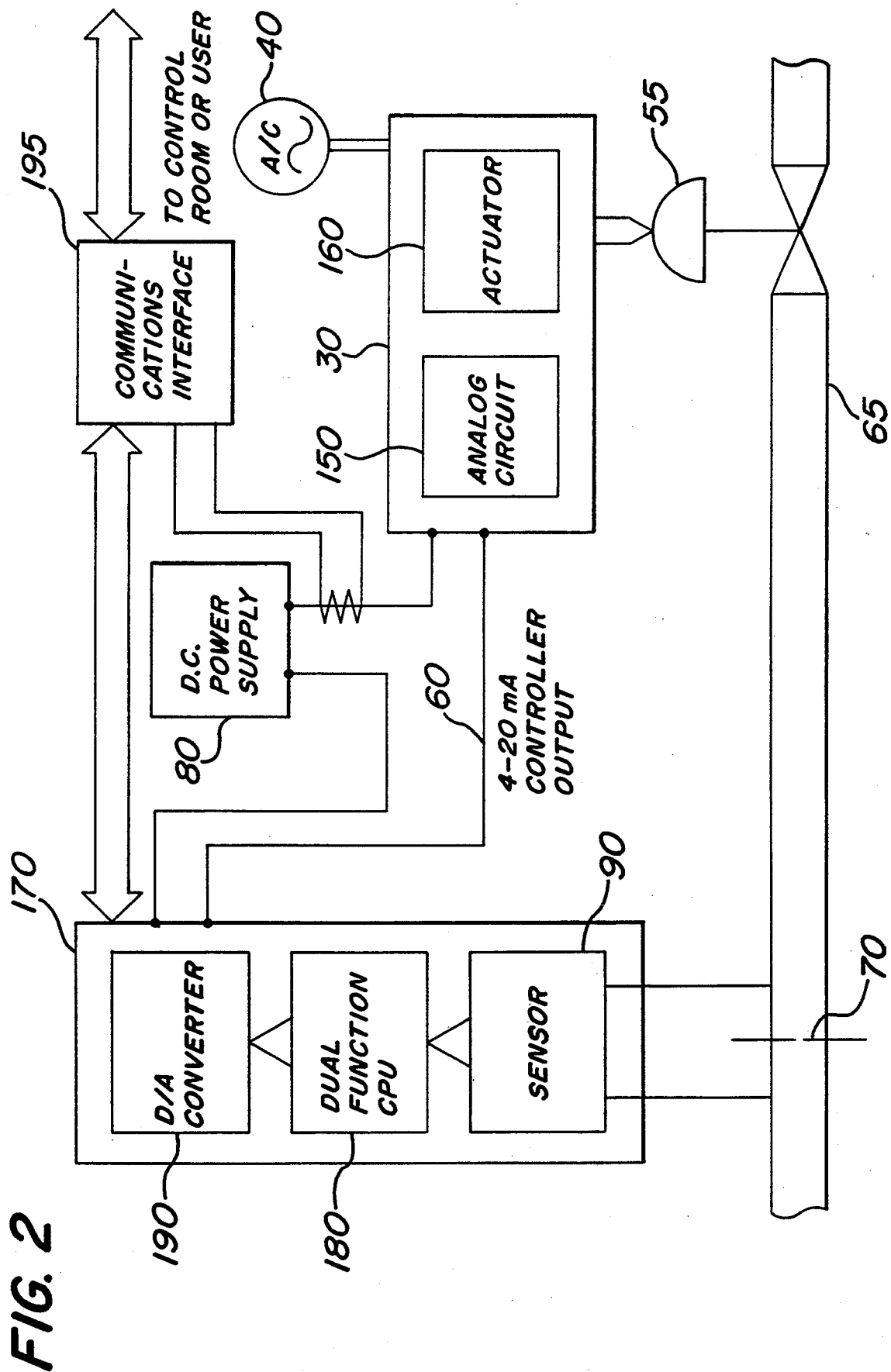
FIG. 2 shows a two-wire process control system having an integrated transmitter/controller provided in accordance with the present invention.

Referring now to FIG. 2, there is shown a process control loop utilizing an integrated transmitter/controller 170 in the control loop in accordance with the present invention. As used herein, the term "integrated" means that the hardware comprising the transmitter and controller unit is physically contained within a single system component and contains a single system CPU. Integrated transmitter/controller 170 can operate in a strict transmitter mode by generating a 4 to 20 milliamp analog current which represents the process variable directly. This process variable current can then be used by a remote controller 20 such as that shown in FIG. 1 having the 4 to 20 milliamp process variable signal as its input.

However, since integrated transmitter/controller 170 in accordance with the present invention integrates the transmitter and controller functions, it can also provide the control functions for the loop, thereby eliminating the usual separate controller unit that is necessary in prior systems. This drastically changes the traditional role of the transmitter as used in prior 4 to 20 milliamp control loops, since when integrated transmitter/controller operates in the controller mode, the transmitter/controller itself generates a 4 to 20 milliamp current that represents the controller output which can be directly wired to a final control element.

The architecture provided with integrated transmitter/controller 170 in accordance with the present invention thus eliminates the need for a separate controller unit and its associated pair of wires. In addition, the value of the process variable and additional loop information may be provided simultaneously and bussed to a control room, for example, through digital communications which can be superimposed on the 4 to 20 milliamp analog current.

Integrated transmitter/controller 170 preferably comprises sensor 90 which is a conventional sensor and oscillation device described in relation to FIG. 1. Sensor 90 provides digital input to dual function CPU 180 which causes the integrated transmitter/controller 170 to operate in a dual mode.

When integrated transmitter/controller 170 is set by dual function CPU 180 to operate only as a transmitter, it provides a 4 to 20 milliamp output that represents the process variable as preferably 0–100 percent of the transmitter range. When the integrated transmitter/controller operates in the transmitter and controller mode, the 4 to 20 milliamp output is a 0–100 percent valve loading controller output in the case when valve 55 is the element which controls the process. Thus, the 0–100 percent valve loading controller signal is bussed directly to control element 30 from integrated transmitter/controller 170 in accordance with the invention. D/A converter 190 converts the signal received from dual function CPU 180, which is preferably a digital signal, to the 4 to 20 milliamp controller output signal 60 which is preferably an analog signal.

In a preferred embodiment, a communications interface 195 is provided in the loop to allow a digital communications signal to be superimposed on the analog 4 to 20 milliamp signal. This digital signal is preferably generated by the communications interface 195 in response to information received by the transmitter/controller 170. The digital communications signal may then be bussed back to the control room or to a user to provide information concerning the state of the transmitter/controller, the process variable or other loop parameters. Communications interface 195 thus provides "bidirectional" communications in a preferred embodiment since it communicates in a preferred embodiment with loop instrumentation, with the control room, and may receive information from the control room to be input to the instrumentation in the loop.

Figure 3:
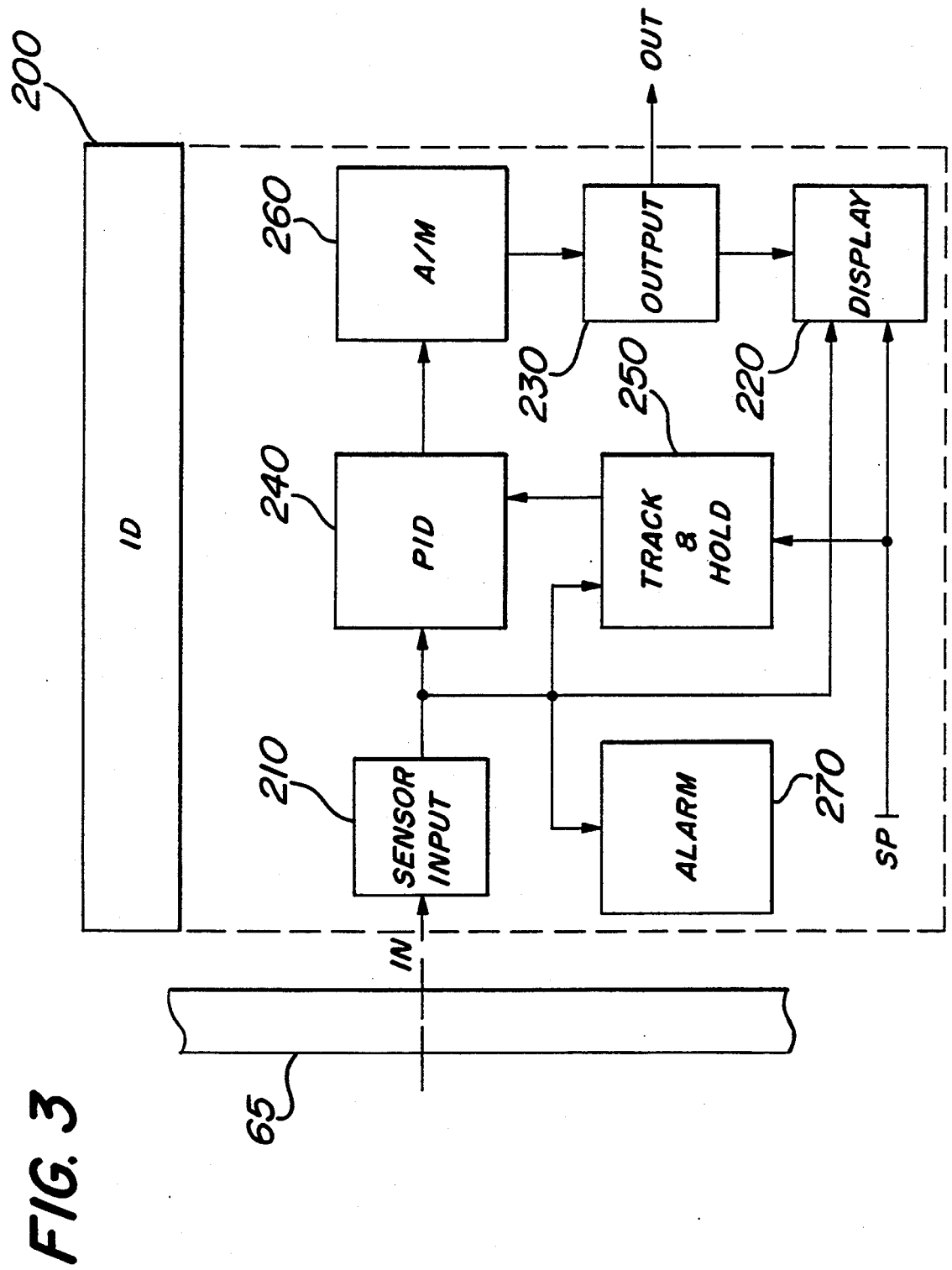
FIG. 3 is a functional block diagram of the controller portion of the integrated transmitter/controller provided in accordance with the present invention.

A functional block diagram of the controller portion of integrated transmitter/controller 170 is shown in FIG. 3. An identification (ID) block 200 preferably provides a user-defined tag which can be assigned to the transmitter/controller and stores other related database information. Sensor input block 210 receives signals from the sensor, performs input ranging and linear square root conversion in a preferred embodiment, and provides a digital filter time constant to the transmitter/controller 170. An operator display block 220 allows a process variable range to be displayed directly at the transmitter/controller along with a process variable label, such as gallons per minute (GPM) or other label to be associated with the particular sensor and process to be controlled. The operator display block is preferably a liquid crystal display indicator to provide visual data.

Analog output block 230 presents the measured process variable in transmitter applications, and the valve loading or other control element signal in transmitter/controller applications to a user observing the transmitter/controller's output in the control room, for example. In a further preferred embodiment, the analog output block 230 includes a user-configurable fail-safe mode that allows for increased plant safety in an industrial environment.

The controller portion preferably contains a standard 3-mode proportional-integral-derivative controller block (PID) 240 which provides direct local process control. A setpoint (SP) track and hold block 250 stores the controller setpoint and further supports tracking or non-tracking modes for auto/manual (A/M) control. The A/M control allows automatic control of the process via the transmitter/controller or by direct control of the process by a technician, for example. The A/M modes are preferably set by the technician or user. In preferred embodiments, the setpoint can be changed from a system master location in the control room or by a hand-held interface. The A/M transfer block 260 allows the controller to be placed in manual in order to provide a manual signal to directly load the valve or other control device. In a preferred embodiment, an alarm block 270 provides two configurable high or low process variable alarms. In still further embodiments, the setpoint may be directly displayed on the display block 220 to the control technician directly at the process.

Integrated transmitter/controller 170 uses the same hardware whether it functions in the transmitter mode or the transmitter/controller mode. Furthermore, multiple integrated transmitter/controllers and control elements may be interfaced in a distributed system in "multi-drop" configuration. A "multi-drop" network is a network of one or two master devices connected to multiple field devices across a common pair of wires or other medium. Multi-drop configuration provides improved database consistency with variable tags originating at the process level, maximized system synchronization resulting from continuous bidirectional communication, reduced installation costs for data acquisition through multi-drop digital inputs, and improved system intercommunications resulting from centralized interrogation of the sensor database by system users at the control room, for example. The multi-drop capability allows multiple transmitter/controllers to be placed on the same pair of wires and is particularly useful when the transmitter/controller operates as a standard transmitter since the loop is not then closed. Furthermore, the communications interface allows the multi-drop information to be easily implemented in accordance with the present invention.

System integration is also greatly improved with transmitter/controller 170. By locating the process range in the transmitter/controller, the process variable can be directly utilized by the entire integrated transmitter/controller system potentially in multidrop configuration. This allows a process value, range, and tag to originate in the transmitter, and as mentioned above, provides consistency of databases throughout the entire multi-drop system. Another advantage to having the process range reside in the integrated transmitter/controller is that now the transmitter can be reranged in process units without requiring a user to calculate a new primary span for the transmitter/controller. Thus by way of example, if a user decides that it wants one of the outputs of the transmitter/controller to represent 0–12.5 GPM instead of 0–15 GPM, it is only necessary to enter a process range of 0–12.5 GPM. The transmitter/controller would then recalculate the primary variable span, for example, 0–69.44 inches $H_2O$, and the transmitter/controller itself reranges its sensor input.

The same types of advantages and extended uses for system alarms are realized with integrated transmitter/controllers in accordance with the present invention. Consistency of alarms between multiple transmitter/controllers is available, and the basic alarms of each of the integrated transmitter/controllers can be incorporated into powerful alarm strategies. This versatility has not heretofore been made available in the art.

Figure 4A:
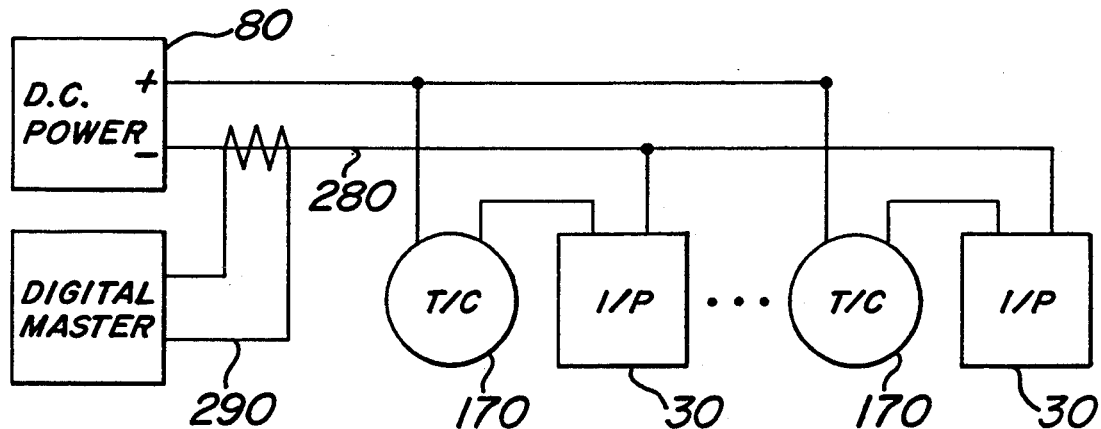
FIGS. 4A–4C illustrate process control loops using integrated transmitter/controllers provided in accordance with the present invention and having bidirectional digital communications.
Figure 4B:
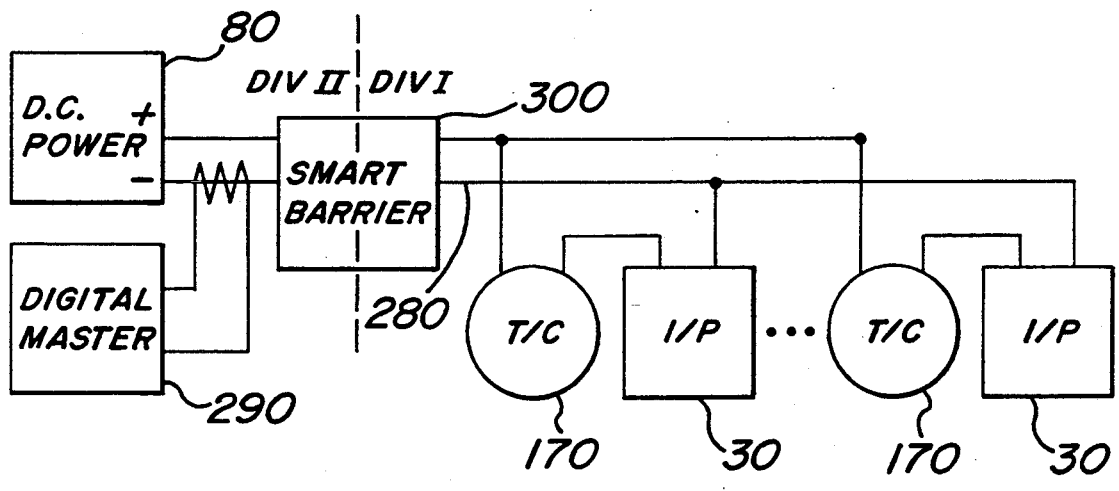
Figure 4C:
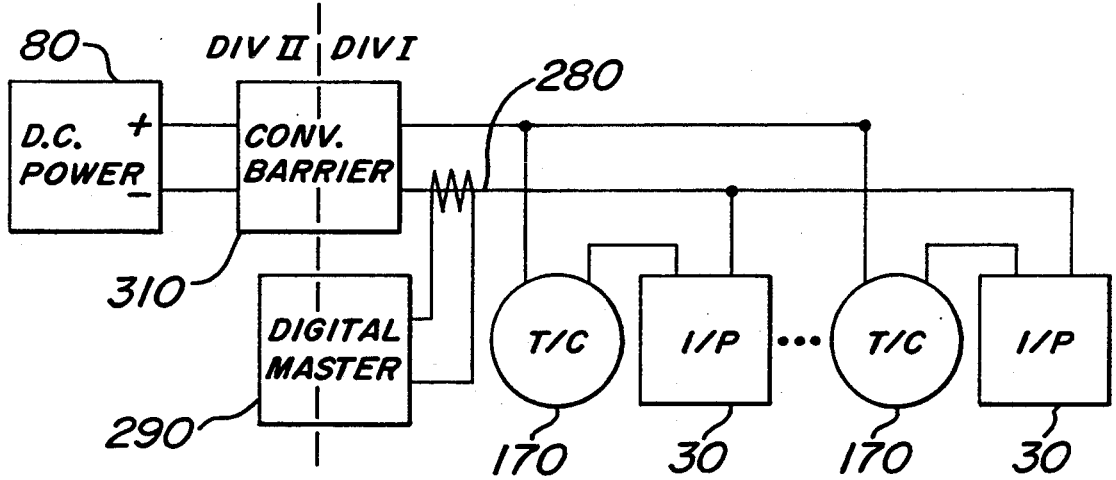

Integrated transmitter/controllers in control loops shown for example in FIGS. 4A, 4B and 4C also allow single-loop digital controllers which are discrete in the loop to access an integrated transmitter/controller operating as a transmitter alone to obtain the process range, and other functions in the transmitter/controller such as software filters and square root extractors stored in the database of the transmitter/controller's dual function CPU. Providing access to the transmitter/controller's database allows increased interaction between panel board instruments and field devices. This also allows a single loop digital controller which may also be operating in the loop to automatically correct its database according to new data from the integrated transmitter/controller and to rerange its process display in order to remain consistent with the process range in the transmitter/controller.

Additionally, the integration of smart transmitters into a distributed control system allows an operator console to rerange the transmitter/controllers and to monitor the database of the transmitter/controllers connected in the system through the use of the digital communications protocol which carries data relating to the loop parameters. This provides an invaluable maintenance tool not heretofore realized with the single mode, smart transmitters discussed earlier.

Furthermore, interfacing the integrated transmitter/controller on a system highway with digital communications will provide an operator in a control room with access to the pertinent parameters of the controller such as for example, tuning and the setpoint. In addition, the process variable, setpoint, valve and loop, and alarm status values are also easily monitored with transmitter/controllers provided in accordance with the present invention.

In accordance with the present invention, the integrated transmitter/controller is a smart transmitter/controller which is microprocessor-based and uses digitally stored data to provide digital communications with the control room. Since the integrated transmitter/controller of the present invention utilizes digital communications, it is preferably interfaced on a control system highway for bidirectional communication. Referring to FIG. 4A, a process control system has integrated transmitter/controller 170 in accordance with the present invention interfaced to a field bus 280.

The field bus is preferably adapted to communicate digital signals. Since transmitter/controller 170 is integrated, it provides the advantageous results of locating the control algorithm at the process and providing an accurate and reliable interface to the control room. In order to attain these advantages, sufficient intelligence must be located at the process level. Additionally, transmitter/controller output updates must be frequent enough to control fast loops, and the communications capability is required in order to allow data transfer between the control room and the field. These necessary aspects are now achievable with transmitter/controllers provided on a field bus in accordance with the present invention.

In order to achieve successful application of the transmitter/controller 170 in a control loop, remote communications with the instrument from a control room is desirable. In a preferred embodiment, the communications interface 195 is a hybrid communications protocol and is provided by a digital master interface 290 so that the integrated transmitter/controller can digitally interface and communicate with the control room. In preferred embodiments, digital master interface 290 implements the HART protocol, which was developed by Rosemount, Inc., of Eden Prairie, Minnesota, wherein the bidirectional communication signal is superimposed on the 4 to 20 milliamp analog signal.

The HART protocol is one of the most widely used hybrid communication protocols in the art and is fully described in the technical literature distributed by Rosemount, Inc. with the HART products. This literature is filed concurrently herewith, and its teachings are specifically incorporated herein by reference.

The HART protocol is a transaction-oriented communications service for process control devices. Designed to augment traditional 4 to 20 milliamp analog signalling, HART devices provide relatively low bandwidth and moderate response time communication in industrial environments. Typical applications include remote process variable interrogation, parameter setting, and diagnostics. Conceptually, the HART protocol can be divided into a data link layer and a physical layer. The data link layer requires specific services of the physical layer. The data link layer specifies primarily the HART protocol, while the physical layer specifies the signalling method, signal voltages, device impedances, and the communications media. The common physical layer uses twisted pair copper cable as the medium, and provides either digital alone, or simultaneous digital and analog 4 to 20 milliamp communications, preferably to distances of about 5,000 feet (1500 meters).

The HART digital signalling is an extension of conventional 4 to 20 milliamp analog signalling. HART superimposes a high frequency current on the low frequency 4 to 20 milliamp current. The two forms of the signalling current share much of the same hardware but are separated in frequency. HART generally recognizes three distinct device types. The most basic is the field instrument, which in this case is the integrated transmitter/controller and which responds to a command received from a master device. The field instruments are classified as either slave devices or burst mode devices. A second device type is the primary master. A primary master is the main communicator with the field instrument. The integrated transmitter/controller having the process controller integrated therein also functions as the primary master in preferred embodiments. The third device type is the secondary master. The secondary master is usually an occasional user of the link. An example of a secondary master is the hand-held communicator interface as mentioned above.

The following types of hardware may be used to construct a HART network. The signalling elements are the primary master and field instrument, that is the integrated transmitter/controller, and a secondary master. The non-signalling elements are the cable, which is the communicating medium or field bus, the network power supply, an intrinsic safety barrier, and the junction box, wiring panels and connectors. A single loop digital controller, which also operates in the loop, may also be considered a non-signalling element in a HART network. Other miscellaneous hardware may comprise any device that meets the impedance installation requirements which are standardized according to HART specifications.

The HART signal is a voltage that exists at one conductor of the twisted pair cable with respect to the other conductor. The signal voltage is produced directly by the master device. Current signals from field instruments are converted to voltage signals by the network resistance. Each HART "frame" is sent as a sequence of bytes using asynchronous character format. This is a common format that is used in most data communication over voice-grade telephone lines, for example. Each device signals in turn by applying its carrier to the field bus for the full duration of its frame. Generally each frame consists of a preamble and message and between frames there is silence. The content and length of the message, the time between frames, and other similar considerations are variable depending upon a particular application in which the HART protocol operates. The HART protocol uses binary, phase-continuous, frequency shift keying (FSK) at about 1200 bits per second. The bit sequence within a character is one start bit, eight data bits, odd parity, and one stop bit. This conforms to ANSI X3.16-1976 part 3.1 except that the number of data bits is eight instead of seven, and the parity over eight data bits plus parity bit is odd.

The transmitted HART waveform provides a rise time requirement to limit coupling, an upper limit on signal strength which also limits coupling, and a lower limit on the signal strength to ensure a sufficient amount of received signal. Furthermore, a shape requirement ensures that the full signal power spectrum is being translated.

Thus, HART is a useful bidirectional communications protocol and provides great diversity for 4 to 20 milliamp control systems. In addition to being taught in the above-referenced technical literature of the Rosemount Company, data communications systems are also described in U.S. Pat. Nos. 4,570,257, Olsen et al.; 4,581,734, Olsen et al.; 4,627,045, Olsen et al.; and 4,677,612, Olsen et al. The teachings of all these prior patents are specifically incorporated herein by reference.

The HART protocol has a maximum speed of about three data transfers per second and does not degrade loop performance in its implementation with the present invention. Because control is performed directly at the process, the speed of the communications does not have an effect on control performance. The digital communications signals are preferably used to monitor the status of the integrated transmitter/controller 170 and to allow the control operator to interface with and manipulate the integrated transmitter/controller by observing the process variable.

In accordance with the present invention, integrated transmitter/controller 170 modulates the loop current in the traditional way a transmitter would normally modulate a 4 to 20 milliamp analog signal. However, instead of the signal acting as an input to a remote controller unit, it is used as the final input to control element 30, which in a preferred embodiment is a current to pressure (I/P) control element. This allows integrated transmitter/controller 170 to be directly interfaced with the process variable in a modern industrial plant, and also reduces wiring costs since only one set of wires must be run for both the transmitter/controller and the final control element.

Referring to FIG. 4B, the digital HART master 290 is interfaced on the highway before a "smart barrier" 300, which separates the hazardous area called the "Division I area" from the "Division II area," which is normally the control room, and provides an intrinsically safe barrier for the system. The smart barrier thus must be able to communicate digitally along the highway and understand the HART protocol. In FIG. 4C, a conventional barrier 310 is used, since the digital HART master 290 is interfaced along the highway after the barrier 310 which separates the Division II and Division I areas.

Integrated transmitter/controllers are equally usable with smart barriers 300 and conventional barriers 310. Additionally, it will be recognized by those with skill in the art that communications protocols other than the HART protocol may be implemented in this system depending upon the particular digital bidirectional communications which are desired for a control system utilizing an integrated transmitter/controller provided in accordance with the present invention.

Figure 5:
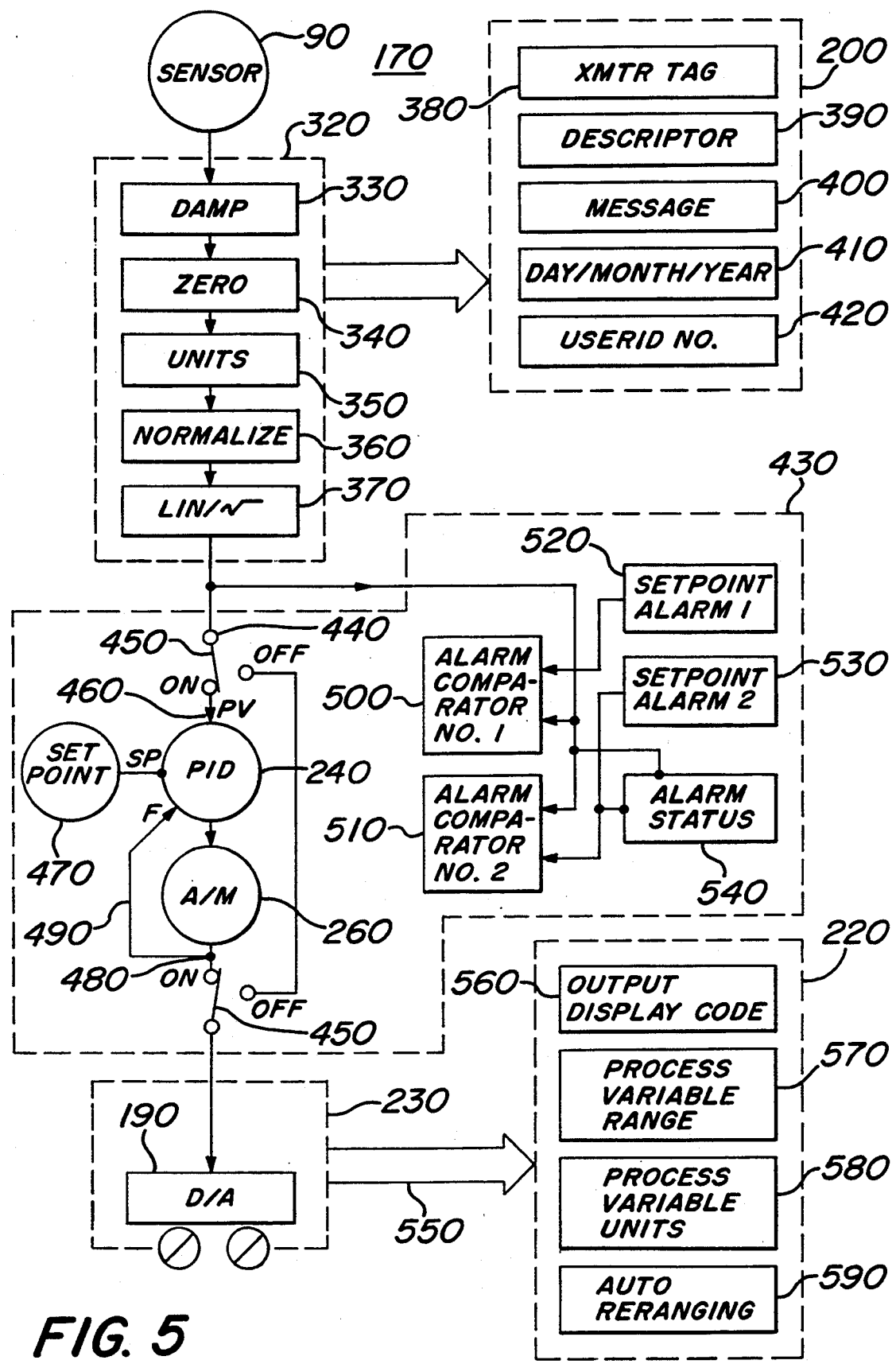
FIG. 5 is a detailed block diagram of an integrated transmitter/controller provided in accordance with the present invention.

Referring to FIG. 5, showing a preferred embodiment of an integrated transmitter/controller according to the present invention, sensor 90 inputs a signal to the transmitter block 320 that contains the electronics and software for preparing and conditioning the signal to appear on the loop. In transmitter block 320, the signal is damped at 330, "zeroed" at 340, and the correct units are applied to it at 350 which are preferably selected by the operator. The signal is then normalized at 360 and when pressure or flow is being monitored by a pressure or flow sensor, the square root extractor 370 operates on the signal to extract the velocity value. It will be further recognized by those skilled in the art that the aforementioned signal conditioning functions are performed by software and data stored in the local memory of the transmitter/controller. The signal conditioning by transmitter block 320 is one of the two functions generally performed by the dual function CPU 180, and methods of conditioning the signal other than the square root extractor 370 can be used especially when the sensor monitors other process variables such as temperature, for example.

The transmitter identification block 200 which is part of the integrated transmitter/controller is interfaced with the transmitter block 320 to allow the user to program particular process and loop parameters and customize the integrated transmitter/controller 170 for specific applications. In particular, the user may program a transmitter tag 380 which is stored in the transmitter ID block, and a descriptor in descriptor memory 390 which allows the user to provide a description of the process being monitored by the loop. Additionally, the user may program a message 400, a day-month-year identifier 410, and a user ID number 420 to provide specific descriptions for the transmitter/controller and to further customize it for the particular application. This information can be digitally bussed back and forth from the control room by the HART protocol for monitoring.

In accordance with the present invention, a controller block 430 is electrically and physically integrated with the transmitter block 320 in integrated transmitter/controller 170. The controller block receives the signal from transmitter block 320 at an input 440. In preferred embodiments, if the integrated transmitter/controller 170 is operating in the controller mode, switches 450 are toggled to the "on" position so that the control functions in PID 240 can be activated. The signal indicative of the process variable, PV, is input at 460 to the three-mode PID controller 240. In further preferred embodiments, the setpoint 470 is also input to the PID 240 so that the controller can control the process and keep the process at the setpoint. The A/M block 260 outputs a signal which is the process control signal at 480, and this signal is also fed-back at 490 to the PID to perform closed loop control of the process.

In a preferred embodiment, the signal from the transmitter block 320 is also input to the alarm functions in the controller block 430. In a further preferred embodiment, there are two alarm comparators, 500 and 510. The alarm comparators 500 and 510 compare the signal from the sensor block 90 to the respective setpoint alarms, 520 and 530, which are preferably programmable by a user. If the alarm comparators 500 and 510 are activated by the difference in the setpoint alarms 520 and 530 as compared to the signal from the transmitter block 320, then the alarms will be triggered. Additionally, an alarm status block 540 is provided to controller block 430 to show the alarm status triggered by the comparators.

The signals which are received from the transmitter block 320 and routed through the controller block 430 are preferably digital signals. Since the signals are preferably digital, the need to convert the signal received by the controller portion from the transmitter portion to an analog signal before it can be used by the controller as in prior two-wire loops is totally eliminated. Thus the need for a second D/A converter is removed with systems provided in accordance with the present invention and the span error for an integrated transmitter/controller is effectively reduced by about one-half as compared to prior systems.

In order to provide an analog output on the loop, signal 480 is bussed to an output block 230 containing the D/A converter 190. This signal is then bussed at 550 to the output block 220, which in preferred embodiments can show an output display code 560, the process variable range 570, the process variable units 580, and any auto-ranging information 590 which it is desired to output to the user in a control room, for example. It will be recognized by those skilled in the art that other types of output information can be provided depending on the particular customized output information desired for a particular process control loop which uses the integrated transmitter/controller 170 provided in accordance with the present invention.

Thus, integrated transmitter/controller 170 eliminates the need for a separate controller in the loop and places all the control functions at the process variable as the process variable is monitored by the transmitter block 320. This significantly reduces the amount of hardware which necessarily must be placed into the loop, reduces the amount of wiring in the loop, and thereby greatly increases the efficiency of installation of a process control loop to monitor an industrial system.

Since the analog controller signal need not be transmitted to the control room, multiple loops may be run off a trunk pair of wires that may or may not provide power for the control loop, but could also support communications between the control room and field instruments. This further reduces the cost of a process control loop provided in accordance with the present invention, since one pair of wires can now service multiple loops. Furthermore, the integrated transmitter/controller described herein improves control accuracy, improves loop responses and greatly reduces the power consumption of the instrumentation in the loop. These advantageous results have not heretofore been achieved in the art, and provide significant increased system reliability, reduced costs, increased system speed, and increased system accuracy.

There have thus been described certain preferred embodiments of integrated transmitter/controllers and methods of measuring process parameters in accordance with the present invention. While preferred embodiments have been described and disclosed, it will be recognized by those skilled in the art that modifications are within the true spirit and scope of the invention. The appended claims are intended to cover all such modifications.

What is claimed is:

1. A two-wire system for sensing and controlling the values of a process variable, comprising:
   control means for controlledly varying said process variable in response to analog control signals supplied thereto;
   sensing means for sensing changes in the value of said process variable and for producing first signals representative thereof;
   an integrated transmitter/controller contained within a single system component and spaced from said control means, said integrated transmitter/controller being responsive to said first signals to develop analog controller output signals for supply to said control means as control signals to controlledly vary said process variable;
   a current supply source;
   a two-wire process control loop operatively interconnecting said current supply source, said integrated transmitter/controller and said control means to effect control of said process variable as a function of said first signals from said sensor means;
   wherein said integrated transmitter/controller comprises a digital CPU, supplied with said first signals and operable in a mode such as to produce, operate upon and output signals containing information corresponding to said analog controller output signals, said transmitter/controller also comprising D/A converter means supplied with digital signals from said CPU to produce said analog controller output signals for delivery over said two-wire loop to said control means.

2. The system of claim 1, wherein said controller output signals are in a range of from 4 to 30 milliamperes.

3. The system of claim 1, further comprising digital bi-directional communication means connected to said integrated transmitter/controller for digitally transmitting process data from said transmitter/controller to said control means superimposed on said analog controller output signals.

* * * * *